(12) United States Patent  
Matsuoka et al.

(10) Patent No.: US 8,771,010 B2  
(45) Date of Patent: Jul. 8, 2014

(54) DEVICE CONNECTOR AND METHOD OF PRODUCING IT

(75) Inventors: Hiroyuki Matsuoka, Yokkaichi (JP); Shinichi Sakamoto, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 67 days.

(21) Appl. No.: 13/412,883

(22) Filed: Mar. 6, 2012

(65) Prior Publication Data

US 2012/0238134 A1    Sep. 20, 2012

(30) Foreign Application Priority Data

Mar. 15, 2011   (JP) .................................. 2011-056334

(51) Int. Cl.
 *H01R 13/73* (2006.01)

(52) U.S. Cl.
 USPC ........................................... 439/542; 439/559

(58) Field of Classification Search
 USPC .......................... 439/271, 542, 559, 566, 606
 See application file for complete search history.

(56) References Cited

U.S. PATENT DOCUMENTS

| | | | |
|---|---|---|---|
| 4,647,129 A * | 3/1987 | Kandybowski et al. ...... | 439/246 |
| 5,487,680 A * | 1/1996 | Yamanashi ................... | 439/552 |
| 5,511,990 A * | 4/1996 | Klemen ........................ | 439/559 |
| 5,690,512 A * | 11/1997 | Zumstein et al. ............. | 439/545 |
| 6,076,258 A | 6/2000 | Abe | |
| 6,089,910 A * | 7/2000 | Suzuki et al. ................. | 439/559 |
| 6,699,069 B2 * | 3/2004 | Inoue ............................ | 439/570 |
| 6,702,611 B1 * | 3/2004 | Miyazaki et al. ............. | 439/559 |
| 6,835,094 B2 * | 12/2004 | Matsushita ................... | 439/559 |
| 7,572,150 B2 | 8/2009 | Matsuoka | |
| 8,187,030 B2 * | 5/2012 | Matsuoka et al. ............ | 439/542 |
| 2002/0016100 A1 | 2/2002 | Okabe et al. | |

* cited by examiner

*Primary Examiner* — Thanh Tam Le

(74) *Attorney, Agent, or Firm* — Gerald E. Hespos; Michael J. Porco; Matthew T. Hespos

(57) ABSTRACT

A terminal block includes a metal plate (30) with an opening (31) penetrating in a plate thickness direction of the plate material and to be attached and fixed to the motor case. A housing (50) made of synthetic resin is fixed to the metal plate (30). Conductive plates (10) are held in the housing (50) while penetrating through the opening (30). The housing (50) includes a flange (52) that covers an edge of the opening (31) while exposing an outer peripheral edge portion of the metal plate (30). The flange (52) includes a wire-side flange (52A) slidable relative to the upper surface of the metal plate (30), a device-side flange (52B) slidable relative to the lower surface of the metal plate (30) and a coupling (52C) arranged in the opening (31) and coupling the both flanges (52A, 52B).

10 Claims, 15 Drawing Sheets

DEVICE CONNECTOR AND METHOD OF PRODUCING IT

BACKGROUND OF THE INVENTION

1. Field of the Invention

The invention relates to a device connector to be attached to a case of a device and to a method of producing it.

2. Description of the Related Art

A device, such as a motor, is housed in a metal case in an electric vehicle or a hybrid vehicle, and a device connector, such as a terminal block, is attached and fixed to such a case. The device connector is connected to a wire-side connector provided on an end of a wire connected to a device, such as an inverter. U.S. Pat. No. 7,572,150 discloses a device connector that includes terminal fittings, a housing made of synthetic resin and a metal plate made of aluminum die cast. The metal plate of the device connector generally is formed with an opening, through which the terminal fittings are inserted, and the terminal fittings are held in the housing while being inserted through the opening.

The aluminum die cast metal plate in the conventional device connector provides sufficient strength, but has high production cost. Thus, a construction capable of ensuring sufficient strength at low cost by using a metal plate formed by press-working a metal flat plate material has been studied in recent years.

Metal and synthetic resin have very different coefficients of thermal expansion and, hence, the housing shrinks more than the metal plate in a cooling process after molding. Thought has been given to forming the housing with a flange that bulges out to cover up to an outer peripheral portion of the metal plate and embossing the surface of the metal plate so that the flange does not slip relative to the metal plate. Thus, the metal plate might forcibly prevent the shrinkage of the synthetic resin from the outer peripheral edge toward the opening of the metal plate. However, this approach does not prevent shrinkage of the synthetic resin in the opening. Thus, a crack may be formed at a boundary between the synthetic resin in the opening and the other synthetic resin. Crack formation in the synthetic resin deteriorates the external appearance and reduces adhesion at an interface between the metal plate and the synthetic resin to form a clearance. Water may enter inside through this clearance.

The invention was completed in view of the above situation and an object thereof is to improve production of a device connector.

SUMMARY OF THE INVENTION

The invention relates to a device connector to be attached to a case of a device. The device connector includes a metal plate with an opening penetrating through the plate in a plate thickness direction. The metal plate is to be attached and fixed to the case of the device. The device connector also has a housing made of synthetic resin and fixed to the metal plate. At least one terminal fitting is held in the housing and penetrates through the opening. The connector housing includes a fixing portion that at least partly covers an opening edge of the opening while exposing an outer peripheral edge of the metal plate. The fixing portion includes a first side sliding portion slidable relative to a first surface side of the metal plate, a second side sliding portion slidable relative to a second surface side of the metal plate and a coupling substantially arranged in the opening and coupling the first and second side sliding portions. The use of a metal plate rather than a cast metal reduces production cost while the above-described construction of the device connector prevents crack formation.

Synthetic resin shrinks more than metal at the time of cooling. However, unlike a conventional way of preventing the shrinkage of the housing more than the metal plate, the first side sliding portion of the fixing portion is caused to slide relative to the first surface side of the metal plate and the second side sliding portion is caused to slide relative to the second surface side of the metal plate as the housing shrinks. Thus, no stress is produced in the synthetic resin and no crack is formed.

The conventional device connector covers the outer peripheral edge of the metal plate with the synthetic resin. However, the outer peripheral edge of the metal plate of the device connector of the invention is exposed. Thus, the synthetic resin located in the opening is not pulled from the opposite sides by the synthetic resin covering the surfaces of the metal plate. Further, the first and second side sliding portions move together via the coupling. Thus, there is no likelihood that the metal plate will warp due to independent sliding movements of the first and second side sliding portions. As a result, crack will not form in the synthetic resin at the opening and at the surfaces of the metal plate and production cost of the device connector can be suppressed by using the metal plate.

A clearance may be formed between the coupling and the inner surface of the opening substantially facing the coupling when the molded housing is cooled. In the particular, the synthetic resin shrinks more than the metal of the integrally formed metal plate and housing. Thus, the first and second side sliding portions slide relative to the metal plate in the cooling process after molding and a clearance is formed between the coupling and the inner surface of the opening at a normal temperature. Contrary to this, the synthetic resin expands so that the coupling approaches the inner surface of the opening within the range of the clearance when heating from a low-temperature state to a high-temperature state, for example, in a thermal shock test. Therefore, the coupling will not receive stress from the inner surface of the opening to form a crack.

A seal-mounting portion made of synthetic resin may be provided circumferentially on a part of a surface of the metal plate that will face the case of the device, radially outward of the fixing portion. The case of the device and the seal-mounting portion may be fixed in a sealed state via a packing. Annular lips may be provided on a sealing surface of the packing to the seal-mounting portion.

The prior art aluminum die cast metal plate had required a surface packing structure to ensure sealing even if there are blow holes. However, a reaction force of rubber that can provide a squeezed amount to ensure sealing is considerably large with the surface packing structure and the metal plate may not withstand such a reaction force. However, the metal plate of the invention is free from blow holes and packing with annular lips can be adopted. Thus, a reaction force of rubber can be reduced drastically and, even though the metal plate is weaker than the aluminum die cast plate, there is no need to increase strength by increasing the plate thickness. Therefore a switch to the use of the metal plate can be made easily.

Plating may be applied to the surfaces of the metal plate.

One of the first and second side sliding portions may project more outward than the other.

The terminal fitting may be in the form of a conductive plate including a terminal main portion, a wire-side fastening portion extending at an angle from one end of the terminal main portion and a device-side fastening portion at the other end of the terminal main portion.

The housing may comprise a first connecting portion to be connected to a connector and a second connecting portion being arranged in the opening and to be connected with the device.

A thick portion having a thick resin layer may be formed from a portion of the first connecting portion to a portion of the second connecting portion.

The terminal fitting may penetrate through the opening of the plate in the thick portion.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 2:
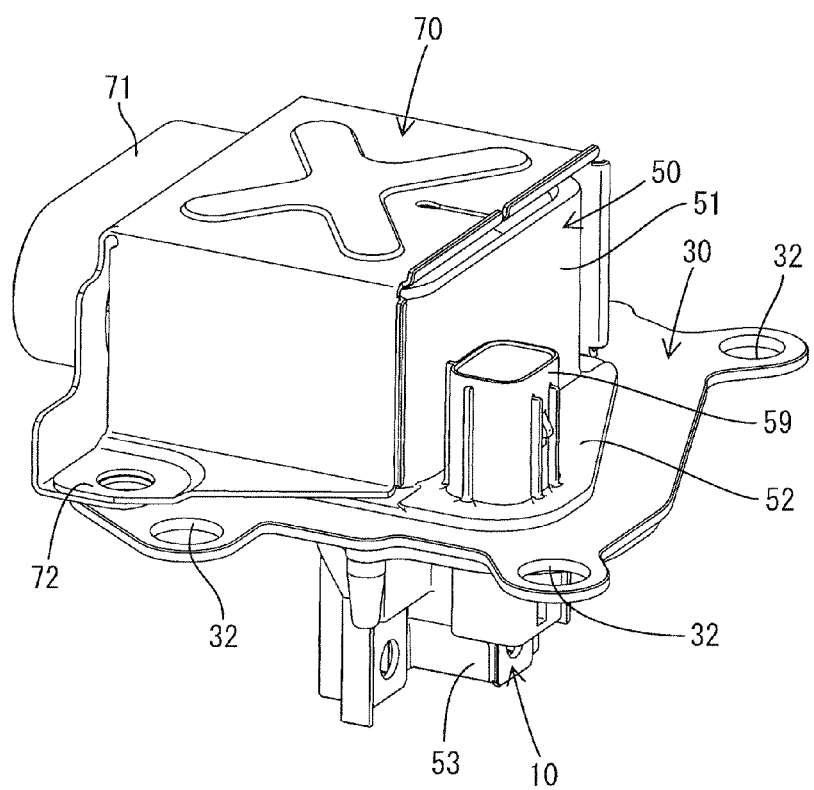
FIG. 2 is a perspective view of the terminal block with a mounted shielding shell when viewed obliquely from behind.
Figure 3:
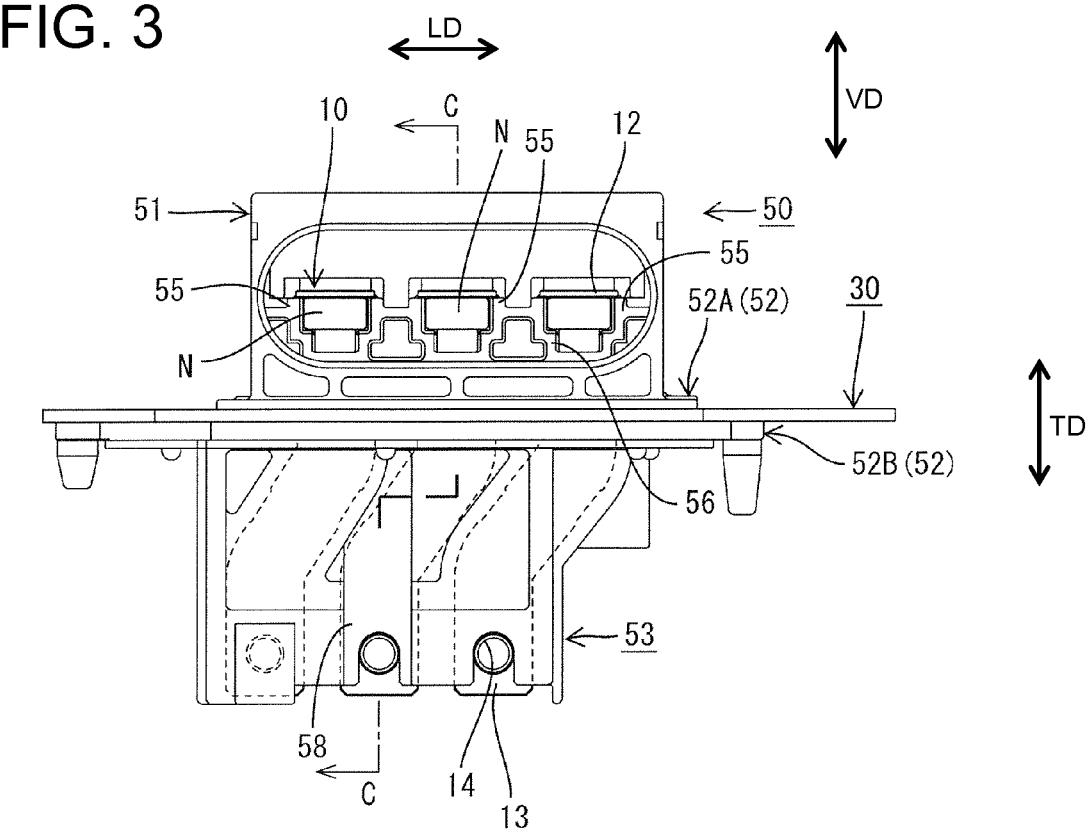
FIG. 3 is a front view of the terminal block.

A first embodiment of the invention is described with reference to FIGS. 1 to 11. In this embodiment, a device connector is a terminal block to be attached to a metal motor case (not shown) that houses a device, such as a motor. As shown in FIG. 3, the terminal block includes a metal plate 30 to be attached and fixed to the motor case, a housing 50 molded integrally to the metal plate 30, and conductive plates 10 held in the housing 50 while penetrating through the metal plate 30 in a plate thickness direction TD. Note that, in the following description, a vertical direction VD is a vertical direction in FIG. 3, a lateral direction LD is a lateral direction in FIG. 3, and forward and backward directions FBD are lateral directions in FIG. 7 with a shown left side referred to as a front side.

Each conductive plate 10 has a first end to be bolt-fastened to one of the device-side busbars (not shown) in the motor case to achieve electrical connection. On the other hand, in an inverter or other such power supply device, wires are arranged to extend toward the motor case and a wire-side connector (not shown) is provided at an end of each wire. Wire-side terminals (not shown) connected to respective wire ends are provided in the wire-side connector, and the wire-side terminals are bolt-fastened to the other ends of the respective conductive plates 10 for electrical connection.

Figure 7:
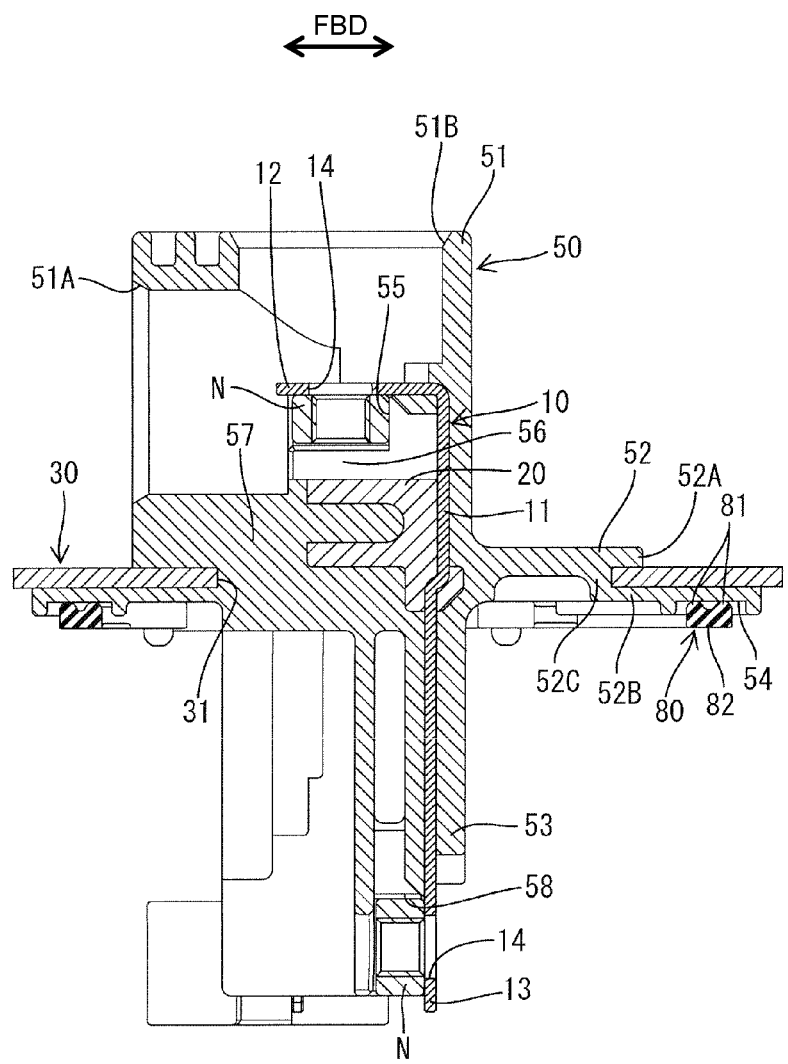
FIG. 7 is a section along C-C of FIG. 3.

Each conductive plate 10 is formed from a metal plate with good electrical conductivity that is punched or cut into a specified shape by a press and then bent, as shown in FIG. 7. A terminal main portion 11 defines a main part of the conductive plate 10. A wire-side fastening portion 12 extends forward from the upper end of the terminal main portion 11, and a device-side fastening portion 13 is at a lower end of the terminal main portion 11. The terminal main portion 11 is longer than the wire-side fastening portion 12.

As shown in FIG. 3, three conductive plates 10 are arranged substantially side by side in the lateral direction LD. Further, the terminal main portions 11 are slightly cranked in the lateral direction LD at intermediate positions, as shown by broken line in FIG. 3. Each wire-side fastening portions 12 and each device-side fastening portions 13 has a bolt insertion hole 14 through which a fastening bolt (not shown) is insertable.

The terminal main portion 11 of the center conductive plate 10 extends substantially in the vertical direction VD and is substantially flat as shown in FIG. 7. The terminal main portions 11 of the left and right conductive plates 10 each include a facing portion bent forward to face the wire-side fastening portion 12 at a substantially vertically central part of the terminal main portion 11 although not shown, and the front end of this facing portion is bent down at substantially the same position as the front end of the wire-side fastening portion 12.

Figure 11:
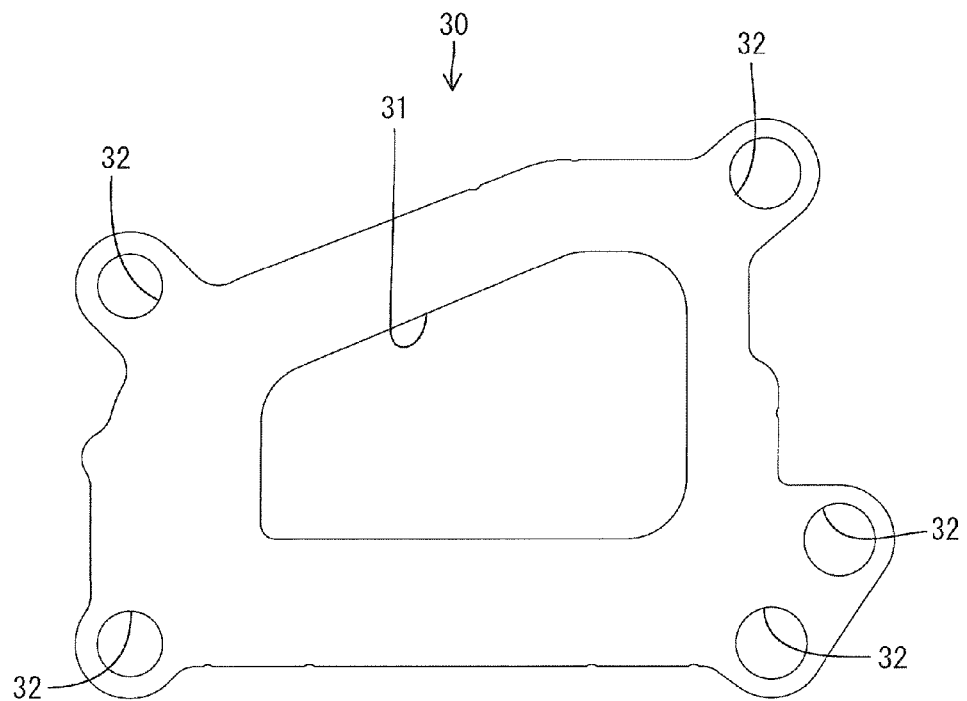
FIG. 11 is a plan view of a metal plate.

As shown in FIG. 11, the metal plate 30 is made of a flat metal plate material and includes an opening 31 that penetrates in a plate thickness direction TD of the plate material. As shown in FIG. 2, the housing 50 includes a small connector 59 molded to be integral to the metal plate 30 and arranged to penetrate through the opening 31 in the vertical direction VD. A wire-side fitting 51 is above the metal plate 30, a substantially plate-like flange 52 is at height position of the metal plate 30 and bulges out sideways (in a plane direction of the metal plate 30), and a device-side fitting 53 is below the metal plate 30. Note that the flange 52 functions as a fixing portion.

Figure 1:
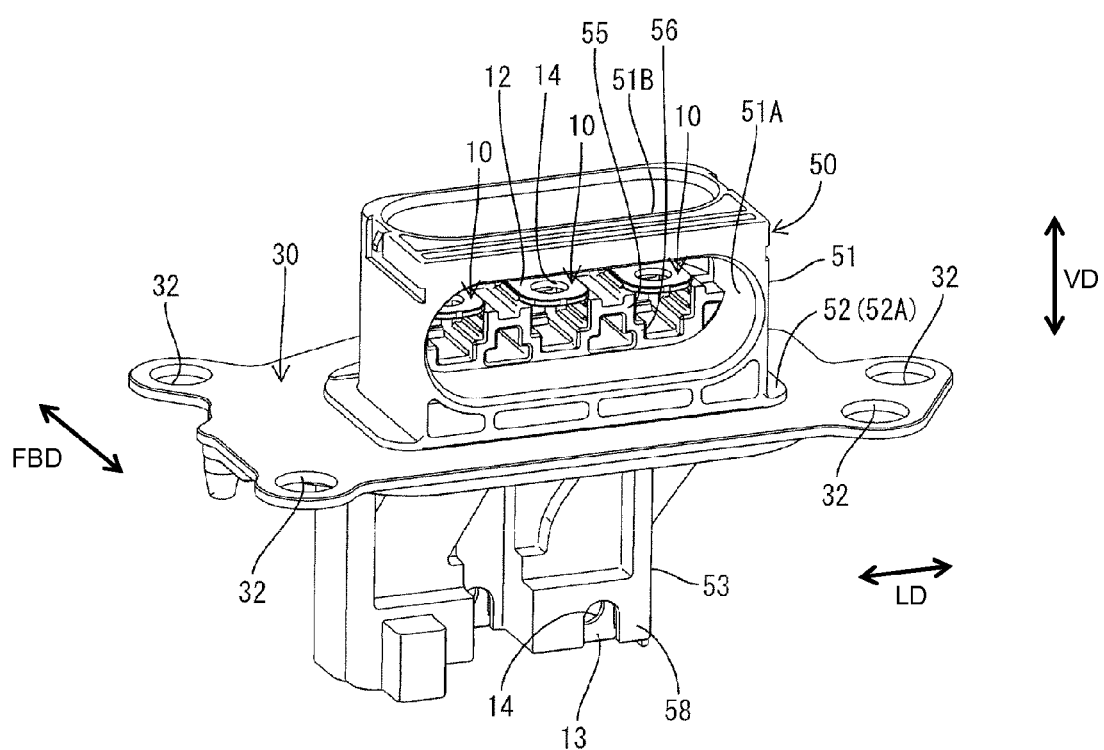
FIG. 1 is a perspective view of a terminal block according to a first embodiment when viewed obliquely from front.

As shown in FIG. 1, the wire-side fitting 51 is substantially a wide box with a front opening 51A that opens forward and an upper opening 51B that opens upward. The wire-side connector can fit into the front opening 51A of the wire-side fitting 51.

As shown in FIG. 3, three nut accommodating portions 55 are formed substantially side by side in the lateral direction LD in the wire-side fitting portion 51. Each nut accommodating portion 55 opens forward and up. Further, all three nut accommodating portions 55 face forward through the front opening 51A and face up through the upper opening 51B. Nuts N are press-fit through the front end opening 51A from the front and are accommodated in the nut accommodating portions 55 so that the axis lines of the nuts N are aligned with the vertical direction VD.

Figure 4:
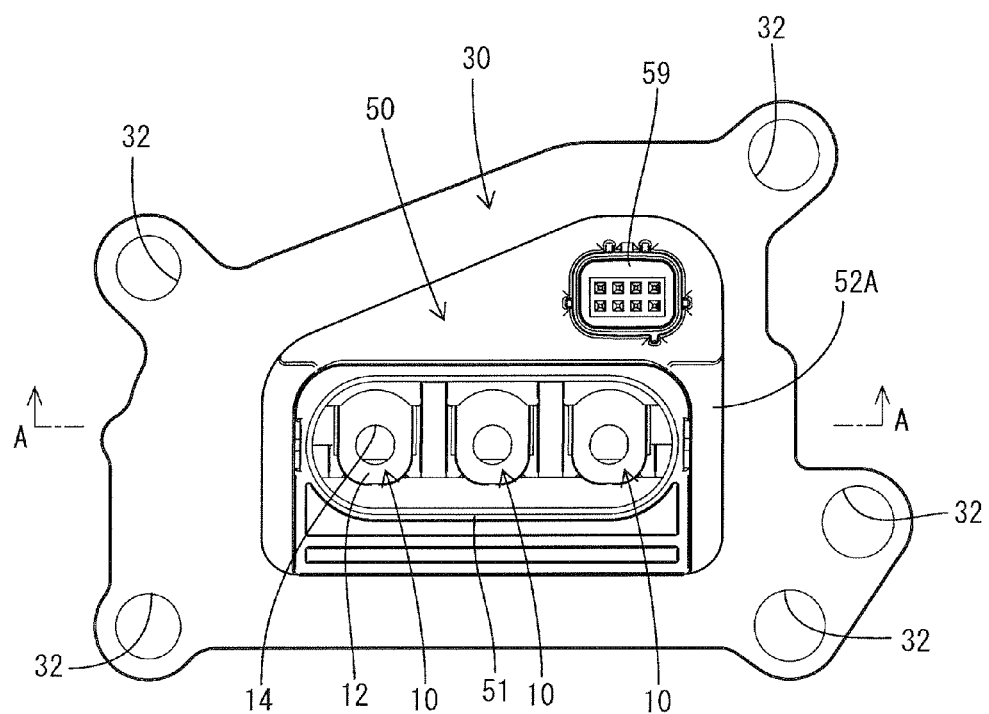
FIG. 4 is a plan view of the terminal block.

The wire-side fastening portions 12 of the conductive plates 10 are arranged to close the upper end openings of the nut accommodating portions 55, as shown in FIGS. 3 and 4. Further, as shown in FIG. 7, each conductive plate 10 is arranged to penetrate through the opening 31 in the vertical direction VD and is held in the housing 50 so that the wire-side fastening portion 12 is arranged around the bolt insertion hole 14 and is exposed forward and up in the wire-side fitting 51. On the other hand, the device-side fastening portion 13 is arranged around the bolt insertion hole 14 and is exposed backward at the lower end of the device-side fitting 53. Each wire-side fastening portion 12 is exposed to the outside through the upper opening 51B of the wire-side fitting 51.

That is, the upper opening 51B of the wire-side fitting 51 may be used as a service hole for receiving a tool for bolt fastening. The wire-side terminal is placed on the wire-side fastening portion 12 and the tool is inserted inside through the upper opening 51B to engage the fastening bolt threadedly with the nut N, thereby electrically connecting the conductive plate 10 and the wire-side terminal are electrically. Note that a service cover (not shown) is mounted to the upper end opening 51B of the wire-side fitting portion 51 after bolt fastening, thereby closing the upper end opening 51B.

An escaping recess 56 is provided below each nut accommodating portion 55 for allowing a leading end of the fastening bolt penetrating through the nut N to escape when the fastening bolt is fastened to the nut N. The escaping recess 56 is narrower than the nut accommodating portion 55 in the lateral direction LD and unitarily formed with the nut accommodating portion 55 by a slide die.

As shown in FIG. 2, a metal shielding shell 70 is mounted on the wire-side fitting 51 and covers the wire-side fitting 51 except the rear surface. The shielding shell 70 is formed by punching or cutting a metal plate with good electrical conductivity into a specified shape by a press and performing a specified bending on the punched or cut conductive metal plate. The shielding shell 70 includes a long cylindrical braided fixing portion 71 and a fixing piece 72 that is fastened to the motor case together with the metal plate 30 for fixing the shielding shell 70 to the metal plate 30 and electrically connecting the shielding shell 70 and the motor case. Specifically, the braided fixing portion 71 is such that a braided wire provided to collectively cover shielded conductive paths of the wire-side connector is crimped against a crimp ring.

The flange 52 covers an opening edge of the opening 31 over substantially the entire periphery, while exposing an outer peripheral edge of the metal plate 30. The flange 52 comprises a wire-side flange 52A that covers a side of the wire-side fitting 51 of the opening edge portion of the opening 31, a device-side flange 52B that covers a side of the device-side fitting 52 thereof, and a coupling 52C arranged substantially along the inner peripheral surface of the opening 31 and coupling the flanges 52A, 52B. The wire-side flange 52A and the device-side flange 52B sandwich the metal plate 30 in the plate thickness direction TD, and the coupling 52C is held in contact with the inner peripheral surface of the opening 31. Thus, the housing 50 is fixed to the metal plate 30. Specifically, as is clear from FIG. 4, the wire-side flange 52A of the flange 52 is shaped to extend in the lateral direction LD and backward. As is clear from FIGS. 5 and 7, the device-side flange 52B covers a surface of the metal plate 30 at the side of the device-side fitting 53. Note that the wire-side flange 52A corresponds to a "first side sliding portion", and the device-side flange 52B corresponds to a "second side sliding portion".

The opening 31 has a substantially trapezoidal shape. Further, the facing portions of the conductive plates 10 at the left and right sides and the terminal main portion 11 of the central conductive plate 10 are arranged in the opening 31. On the other hand, a thick portion 57 having a thick resin layer is formed from a lower part of the wire-side fitting portion 51 to an upper part of the device-side fitting portion 53, as shown in FIG. 7. That is, the three conductive plates 10 having a complicated shape penetrate through the opening 31 of the metal plate 30 in this thick portion 57.

Mounting holes 32 are formed at the outer periphery of the metal plate 30. Fixing bolts or rivets (not shown) are inserted through the mounting holes 32 and fastened to the motor case for attaching and fixing the terminal block to the motor case.

The device-side fitting 53 is housed into the motor case when the terminal block is fixed to the motor case. Further, as shown in FIG. 1, three nut accommodating portions 58 are formed in the device-side fitting 53. The nut accommodating portion 58 in the center position is arranged behind the other nut accommodating portions 58. The fastening bolts are engaged threadedly with respective nuts N in the nut accommodating portions 58 of the device-side fitting 53 to connect the conductive plates 10 and the device-side busbars electrically similar to the nut accommodating portions 55 of the wire-side fitting 51. In this way, the wire-side terminals and the device-side busbars are connected electrically using the conductive plates 10 as intermediate terminals.

Figure 8:
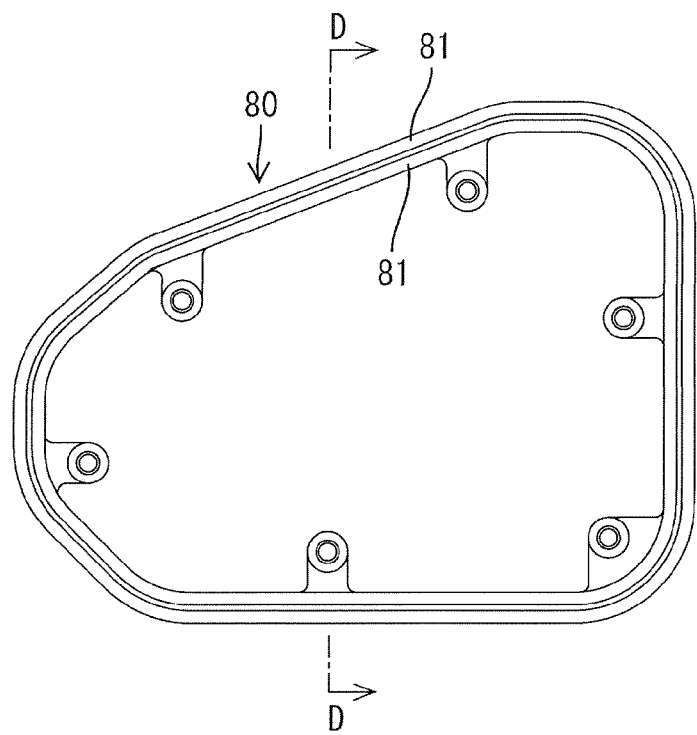
FIG. 8 is a plan view of a packing.
Figure 9:
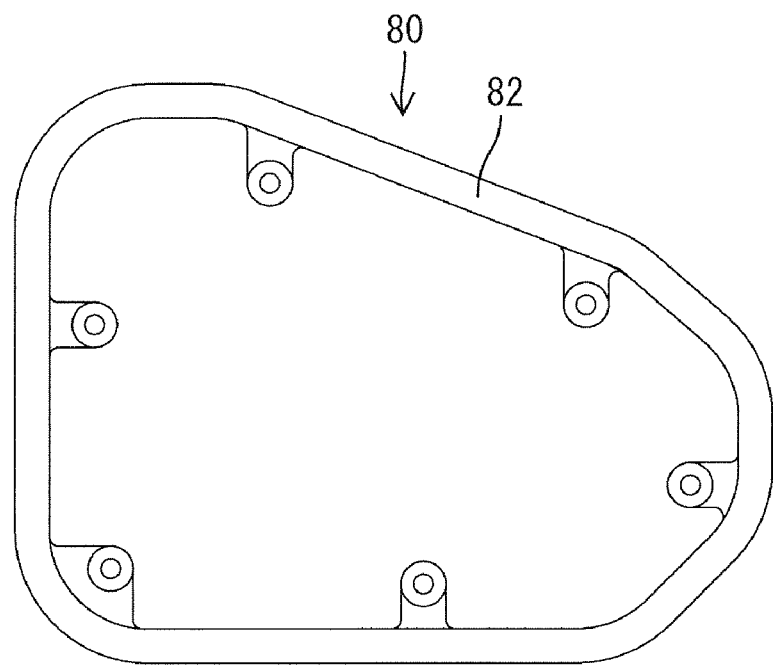
FIG. 9 is a bottom view of the packing.
Figure 10:
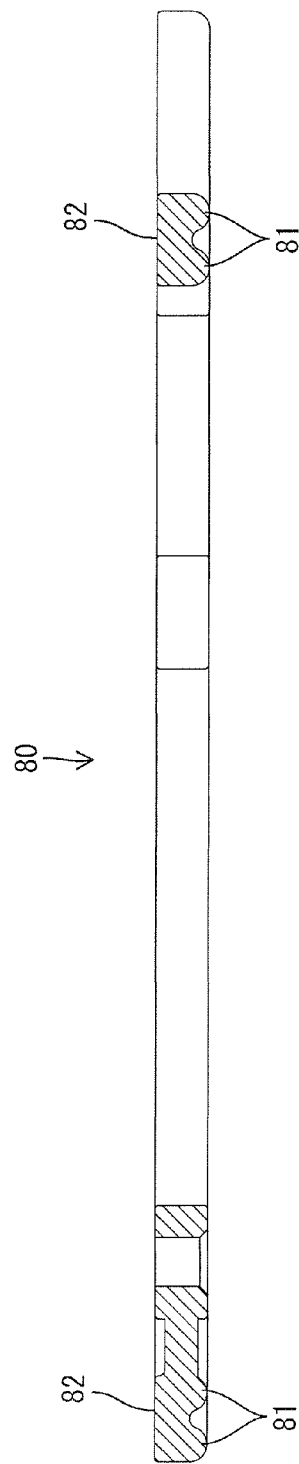
FIG. 10 is a section along D-D of FIG. 8.

As shown in FIG. 7, the device-side flange 52B of the flange 52 bulges out laterally in a direction parallel to a plane of the metal plate 30 more than the wire-side flange 52A. A packing mounting groove 54 is formed circumferentially in a part of the device-side flange 52B bulging out from the wire-side flange 52A and can receive a substantially ring-shaped packing 80. The packing 80 is made of a resilient material, such as rubber, and includes annular lips 81 on a sealing surface to the packing mounting groove 54, as shown in FIGS. 8 to 10. A surface of the packing 80 opposite the surface with the annular lips 81 defines a surface sealing portion 82 to be surface sealed to the motor case. The motor case and the device-side flange 52B are fixed in a sealed manner via the packing 80 by bolt-fastening the metal plate 30 to the motor case. The annular lips 81 form a sealing structure for the device-side flange 52B and a pressing force required to press the annular lips 81 for a sealing purposes is small. Accordingly, it is not necessary to ensure strength by increasing the thickness of the metal plate 30 and sufficient sealing performance can be obtained with a smaller pressing force than in the case of using a metal plate made of aluminum die cast.

Figure 5:
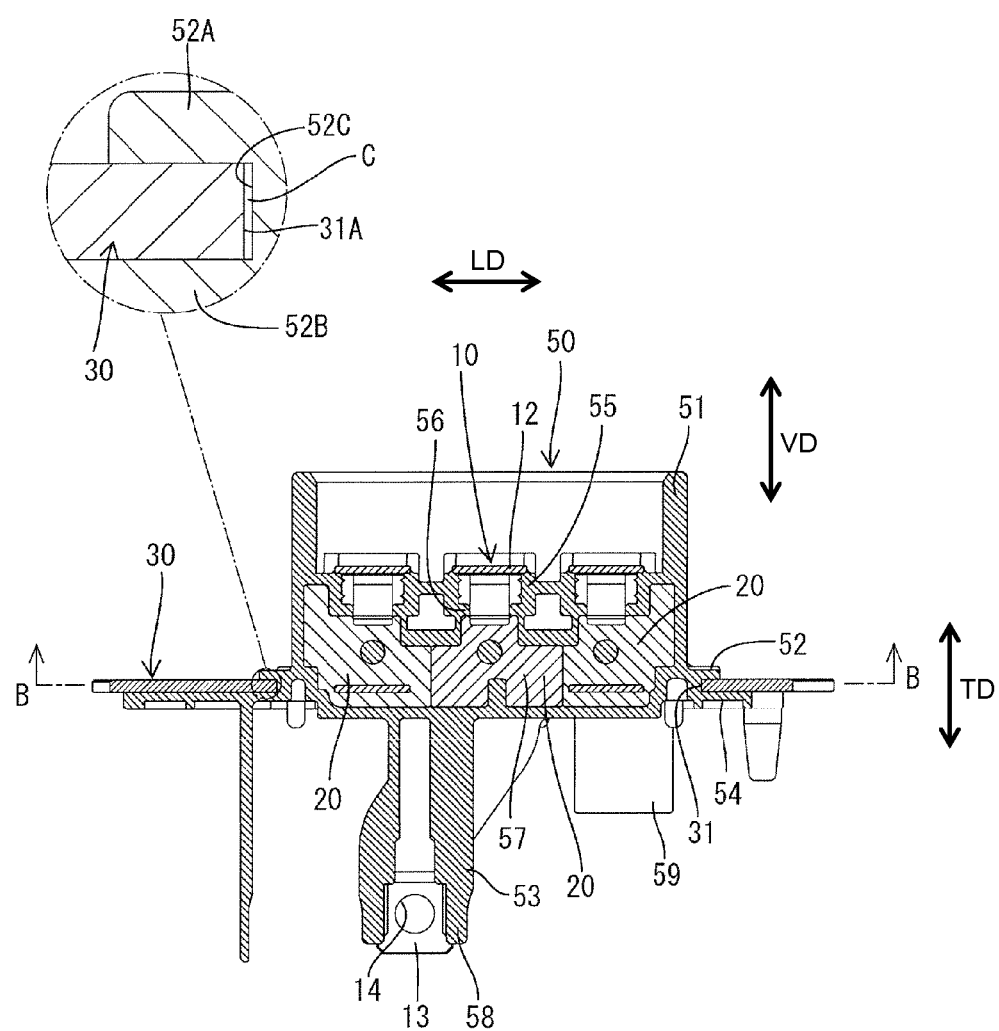
FIG. 5 is a section along A-A of FIG. 4.
Figure 6:
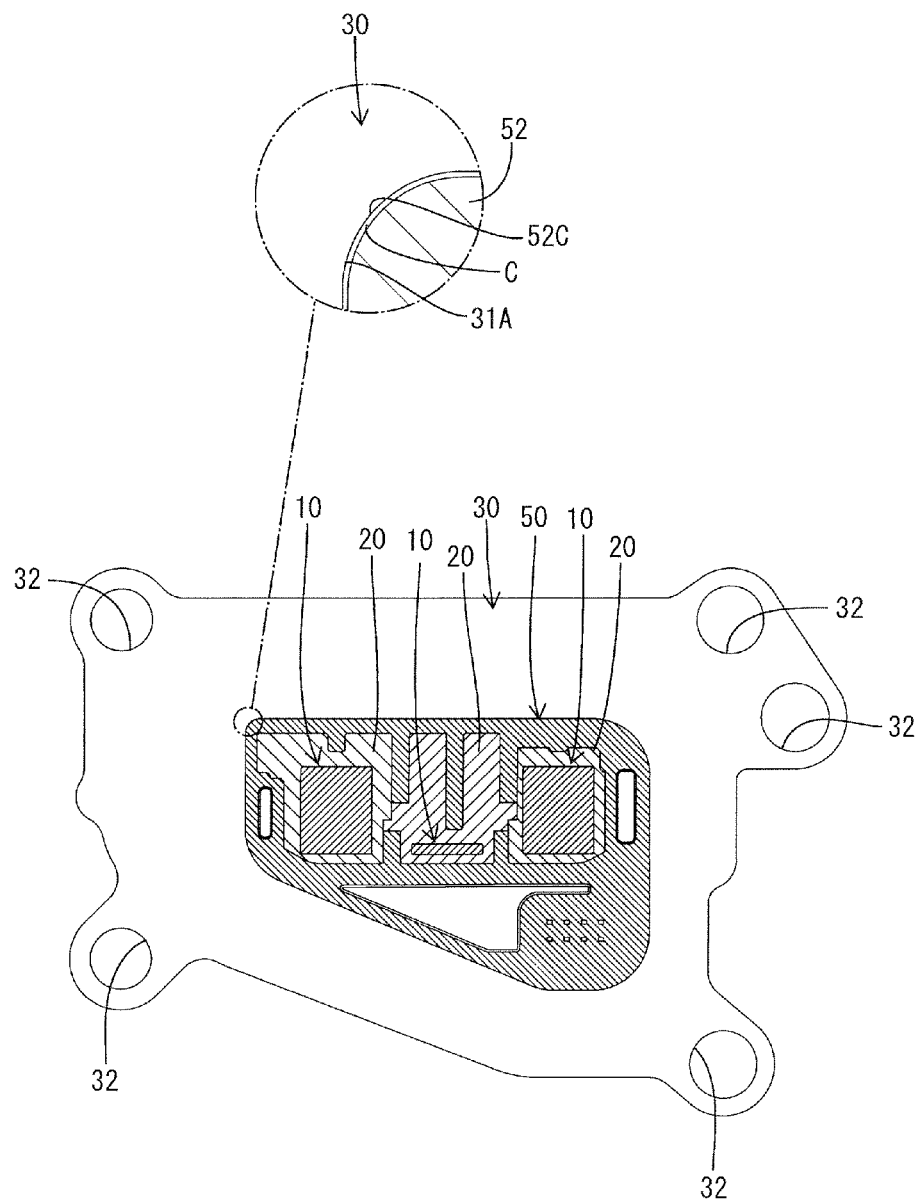
FIG. 6 is a section along B-B of FIG. 5.

The flange 52 is slidable relative to the metal plate 30. Specifically, the wire-side flange 52A is slidable relative to the upper surface of the metal plate 30, and the device-side flange 52B is slidable relative to the lower surface of the metal plate 30. Further, the wire-side flange 52A and the device-side flange 52B are coupled to each other by the coupling 52C that faces an inner surface 31A of the opening 31. Specifically, as shown in FIGS. 5 and 6, a clearance C is set between the coupling 52C and the inner surface 31A of the opening 31. This clearance C is formed since synthetic resin shrinks more than metal in a cooling process after molding when the metal plate 30 and the housing 50 are integrally formed. That is, the clearance C is not formed when molten resin is injected, but is formed when synthetic resin in the opening 31 shrinks while the wire-side flange 52A, the device-side flange 52B and the coupling 52C slip toward the opening 31.

Plating is applied to the surfaces of the metal plate 30 in this embodiment. However, the metal plate material may be used without plating. Further, no process such as embossing is performed on the metal plate 30 except at the opening 31. Thus, the synthetic resin can slide on the surfaces of the metal plate 30 by expansion by heating or shrinkage by cooling.

The connector is formed by placing the conductive plates 10 in a primary molding die (not shown). The primary die then is clamped and primary molding resin is injected to form three types of cores 20. Subsequently, these three types of cores 20 are set in a secondary molding die (not shown). The secondary die is clamped and secondary molding resin is injected to form the terminal block. The secondary molding resin shrinks toward the opening 31 in a cooling process after secondary molding. Thus, the clearance C is formed between the inner surface 31A of the opening 31 and the coupling 52C. The secondary molding resin shrinks while slipping on the surfaces of the metal plate 30 in this cooling process. Hence, there is no likelihood that stress is accumulated in the secondary molding resin to form a crack.

A thermal shock test gives a thermal shock to the terminal block by repeating a low-temperature state (lower than a normal temperature) and a high-temperature state (higher than a normal temperature). Synthetic resin expands when a transition is made from the low-temperature state to the high-temperature state. Thus, the wire-side flange 52A slides on the upper surface of the metal plate 30 and the device-side flange 52B slides on the lower surface of the metal plate 30. Although this causes the coupling 52C to approach the inner surface 31A of the opening 31 to decrease or fill up the clearance C, a situation is not reached where the coupling portion 52C receives stress from the inner surface 31A of the opening 31 to form a crack.

Contrary to this, the synthetic resin shrinks when a transition is made from the high-temperature state to the low-temperature state. As a result, the wire-side flange 52A slides on the upper surface of the metal plate 30 and the device-side flange 52B slides on the lower surface of the metal plate 30. Further, the coupling 52C moves toward the opening 31 to form or increase the clearance C to the inner surface 31A of the opening 31. Note that the coupling 52C couples the wire-side flange 52A and the device-side flange 52B so that both flanges 52A, 52B slide in tandem or at the same time. This prevents a situation where sliding distances of the wire-side flange 52A and the device-side flange 52B differ and the metal plate 30 warps.

As described above, the flange 52 is slidable relative to the metal plate 30 to prevent crack formation in the synthetic resin. Further, the coupling 52C couples the wire-side flange 52A and the device-side flange 52B. Thus, both flanges 52A, 52B slide in tandem and the metal plate 30 will not warp. Further, the clearance C is provided between the inner surface 31A of the opening 31 and the coupling 52C in a normal-temperature state. Thus, crack formation due to stress received by the coupling 52C from the inner surface 31A of the opening 31 in the high-temperature state of the thermal shock test can be prevented. Further, the annular lips 81 of the packing 80 are pressed by the device-side flange 52B and the metal plate 30 in the packing mounting groove 54. The annular lips 81 provide sufficient sealing with a small pressing force.

A second embodiment of the invention is illustrated FIGS. 12 to 15. Constructions of this embodiment corresponding to the first embodiment are identified by the reference numerals of the first embodiment plus 100 and constructions, functions and effects similar to those of the first embodiment are not described again. The following description is centered on constructions different from the first embodiment.

Figure 12:
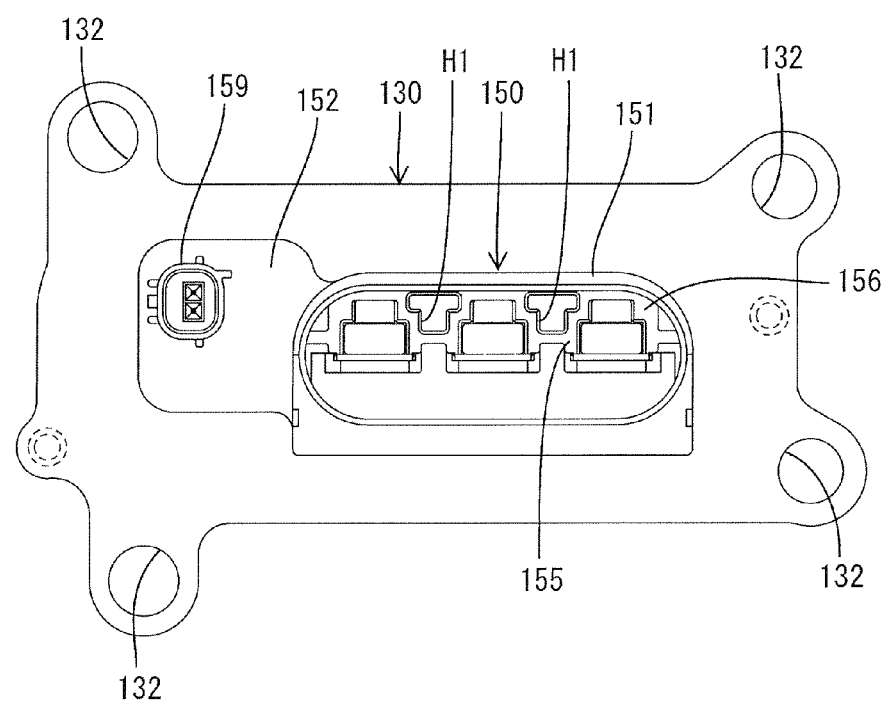
FIG. 12 is a plan view of a terminal block according to a second embodiment.
Figure 15:
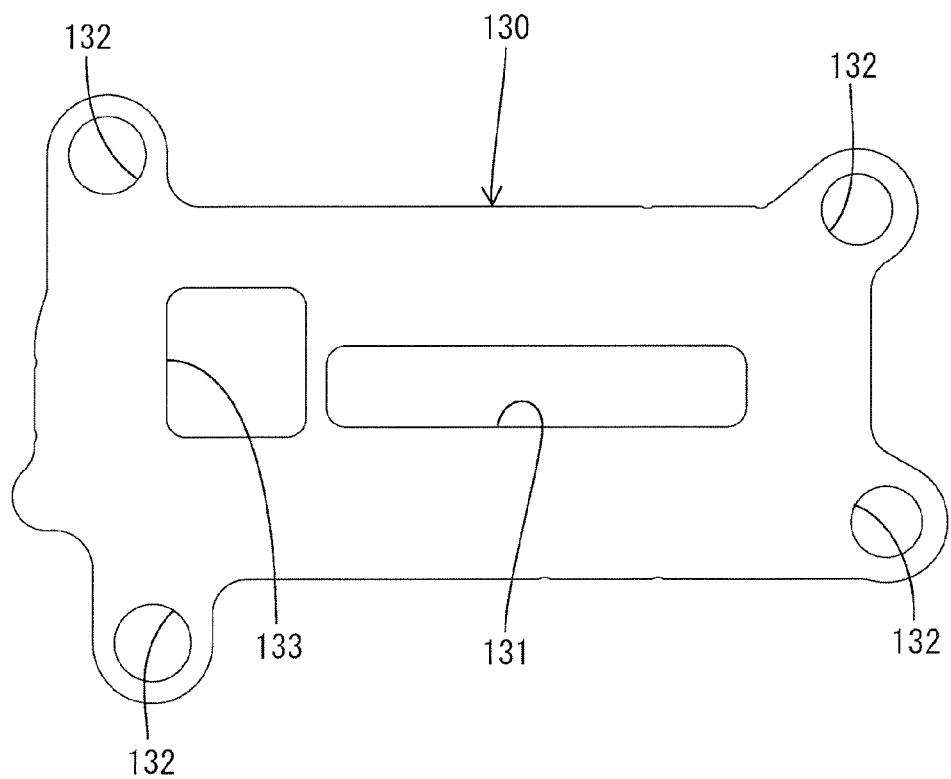
FIG. 15 is a plan view of the metal plate.

As shown in FIGS. 12 and 15, the metal plate 130 of this embodiment has a wide rectangular shape and mounting holes 132 are formed at four corners thereof. An opening 131 and a small opening 133 are formed in a metal plate 130. A wire-side fitting 151 and a device-side fitting 153 are arranged in the opening 131 and a small connector portion 159 is arranged in the small opening 133.

Figure 14:
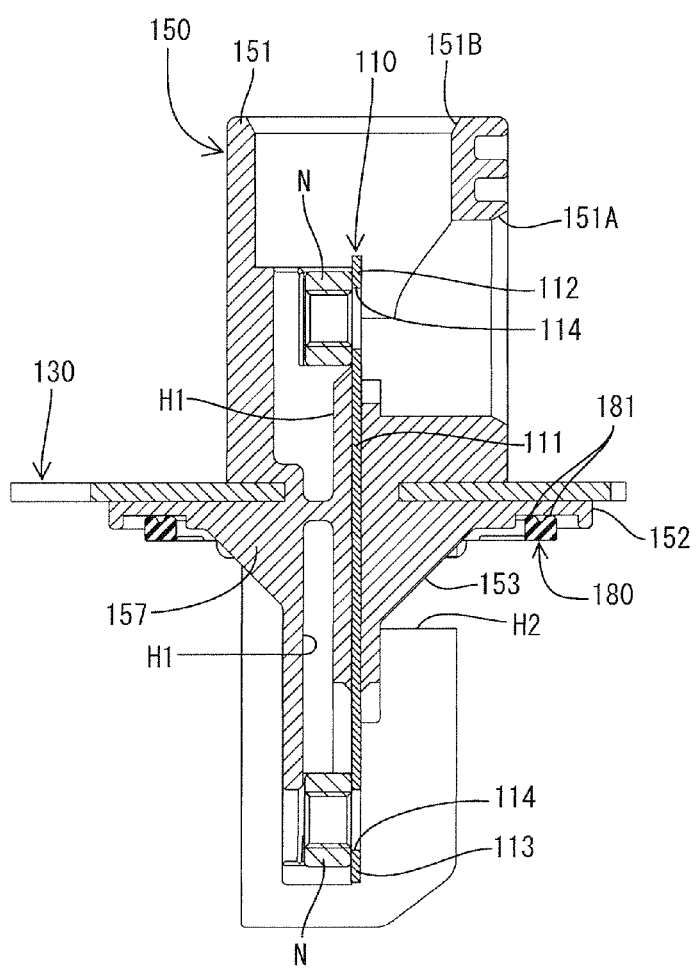
FIG. 14 is a section along E-E of FIG. 13.

As is clear from FIG. 14, the housing 150 is not formed in two processes with primary molding and secondary molding. Rather, the housing 150 is formed in one process by setting conductive plates 110 in a lower die of a molding die, clamping the molding die and injecting molten resin. The vertically extending conductive plates 110 are insert-molded in the connector housing 150, and wire-side fastening portions 112 vertically extend flush with terminal main portions 111.

Figure 13:
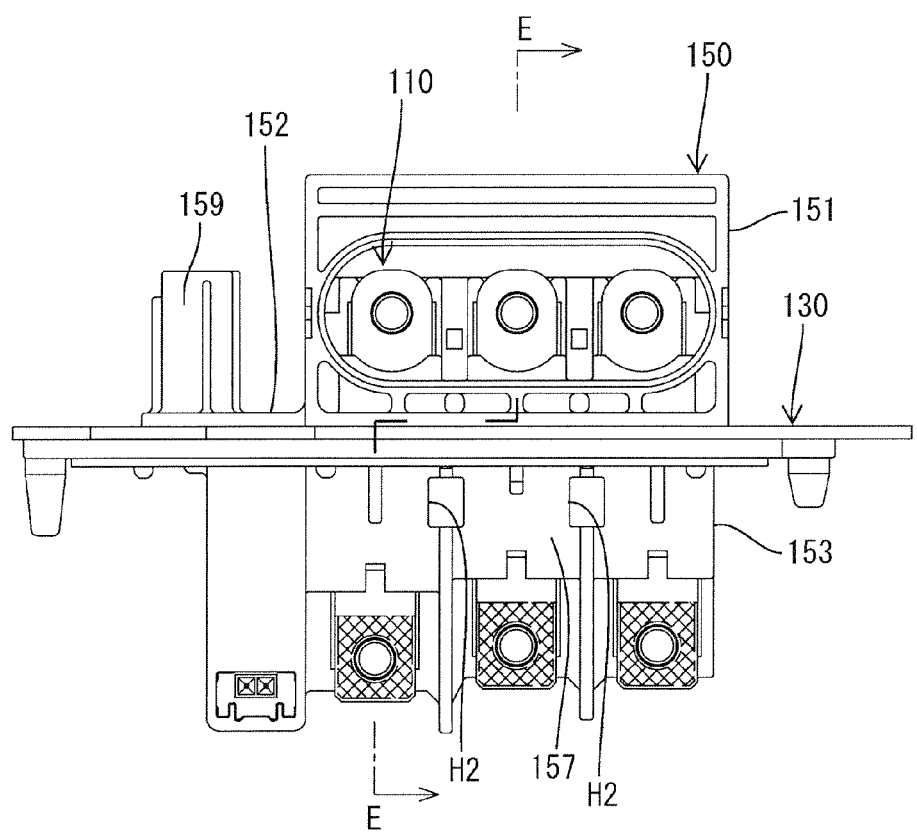
FIG. 13 is a front view of the terminal block.

As shown in FIG. 14, a thick portion 157 is formed with vertical mold removal holes H1 that communicate with escaping recesses 156. Two mold removal holes H1 are provided in correspondence with upper and lower escaping recesses 156 to prevent the formation of voids in the thick portion 157. Further, as shown in FIG. 13, the thick portion 157 is formed with forwardly open mold removal holes H2 to further prevent the formation of voids in the thick portion 157.

The small connector portion 159 and the wire-side fitting 151, and the small connector portion 159 and the device-side fitting 153 are coupled respectively to each other via a common flange 152. The flange 152 is slidable relative to the metal plate 130 to prevent crack formation caused by a temperature variation in a cooling process after the molding of the housing 150 and a thermal shock test.

The invention is not limited to the above described embodiments. For example, the following embodiments also are included in the scope of the invention.

The flange is formed integrally with the metal plate in the above embodiments. However, the flange may be formed separately from the metal plate and may be mounted later according to the invention. That is, the first side sliding portion and the second side sliding portion may be arranged to sandwich the metal plate from the opposite sides and integrally assembled by a bolt.

A clearance exists between the coupling and the inner surface of the opening in the above embodiments. However, no clearance may be provided according to the invention, for example, when the opening is small and no crack is formed even if the synthetic resin in the opening expands and stress is received from the inner surface of the opening.

The packing has annular lips on one surface in the above embodiments. However, a packing with surface sealing portions on both surfaces may be used.

The flange 52 covers the edge of the opening 31 over the entire periphery in the above embodiment. However, at least one flange (fixing portion) may be formed to cover a part of the edge of the opening 31 according to the invention. This leads to a cost reduction by reducing the amount of the resin and reduces the influence of thermal shrinkage by reducing the amount of the resin covering the opening edge of the opening, thereby reducing friction between the metal plate and the fixing portion and making the fixing portion more easily slidable relative to the metal plate.

The device-side flange 52B projects out more than the wire-side flange 52A in the above embodiment. However, the device-side flange and the wire-side flange may have the same length or the device-side flange may be shorter than the wire-side flange.

The packing mounting groove 54 is formed integrally or unitarily in the device-side flange 52B in the above embodiment. However, a seal-mounting portion may be formed separately from the device-side flange and the packing mounting groove may be formed in this seal-mounting portion. That is, the seal-mounting portion may be formed in conformity with the mounting position of the packing.

The plate 30 need not be solid metal and may be made of any other material, such as a composite material, a layered material or the like.

What is claimed is:
1. A device connector to be attached to a case of a device, comprising:
a metal plate having opposite first and second surfaces spaced apart in a plate thickness direction and an opening penetrating the plate in the plate thickness direction;

a unitary housing made of a synthetic resin that is susceptible to crack formation and molded to the plate at the opening; and at least one terminal fitting held in the housing while penetrating through the opening;

wherein:

the housing includes a fixing portion that at least partly covers an edge of the opening while exposing an outer peripheral edge of the plate;

the fixing portion includes a first side sliding portion that extends continuously around the housing and is slidable relative to the first surface of the plate, a second side sliding portion that extends continuously around the housing and is slidable relative to the second surface side of the plate and a coupling arranged in the opening and coupling the first side sliding portion and the second side sliding portion, the first and second sliding portions being parallel to one another at all locations thereon; and a clearance is formed between the coupling and an inner surface of the opening facing the coupling in a state where the housing is cooled after molding.

2. The device connector of claim 1, wherein plating is applied to surfaces of the plate.

3. The device connector of claim 1, wherein one of the first side sliding portion and the second side sliding portion projects more outward than the other.

4. The device connector of claim 1, wherein the housing comprises a first connecting portion to be connected to a connector and a second connecting portion arranged in the opening and to be connected with the device.

5. The device connector of claim 4, wherein a thick portion having a thick resin layer is formed from a portion of the first connecting portion to a portion of the second connecting portion.

6. The device connector of claim 5, wherein the terminal fitting penetrates through the opening of the plate in the thick portion.

7. A device connector to be attached to a case of a device, comprising:

a plate having opposite first and second surfaces spaced apart in a plate thickness direction and an opening penetrating the plate in the plate thickness direction;

a housing made of synthetic resin and fixed to the plate; and at least one terminal fitting held in the housing while penetrating through the opening, wherein:

the housing includes a fixing portion that at least partly covers an edge of the opening while exposing an outer peripheral edge of the plate;

the fixing portion includes a first side sliding portion slidable relative to the first surface of the plate, a second side sliding portion slidable relative to the second surface side of the plate and a coupling arranged in the opening and coupling the first side sliding portion and the second side sliding portion;

a seal-mounting portion made of synthetic resin is provided circumferentially on a part of a surface of the plate, that will face the case of the device, radially outward of the fixing portion;

the case of the device and the seal-mounting portion are fixed in a sealed state via a packing; and a clearance is formed between the coupling and an inner surface of the opening facing the coupling in a state where the housing is cooled after molding.

8. The device connector of claim 7, wherein the plate is a metal plate made of a metal plate material as a base material.

9. The device connector of claim 7, wherein annular lips are provided on a sealing surface of the packing.

10. A device connector to be attached to a case of a device, comprising:

a plate having opposite first and second surfaces spaced apart in a plate thickness direction and an opening penetrating the plate in the plate thickness direction;

a housing made of synthetic resin and fixed to the plate; and at least one terminal fitting held in the housing while penetrating through the opening, wherein:

the housing includes a fixing portion that at least partly covers an edge of the opening while exposing an outer peripheral edge of the plate;

the fixing portion includes a first side sliding portion slidable relative to the first surface of the plate, a second side sliding portion slidable relative to the second surface side of the plate and a coupling arranged in the opening and coupling the first side sliding portion and the second side sliding portion;

the terminal fitting is a conductive plate with a terminal main portion, a wire-side fastening portion at one end of the terminal main portion and being substantially perpendicular to the terminal main portion, and a device-side fastening portion provided at another end of the terminal main portion; and a clearance is formed between the coupling and an inner surface of the opening facing the coupling in a state where the housing is cooled after molding.

* * * * *